(12) United States Patent
Minegishi (10) Patent No.: US 8,726,370 B2
(45) Date of Patent: May 13, 2014

(54) CONTROLLING IMAGE FORMING FUNCTION

(75) Inventor: Youichi Minegishi, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 1432 days.

(21) Appl. No.: 12/182,635

(22) Filed: Jul. 30, 2008

(65) Prior Publication Data

US 2009/0038002 A1    Feb. 5, 2009

(30) Foreign Application Priority Data

Aug. 2, 2007   (JP) .................................. 2007-202205
May 21, 2008   (JP) .................................. 2008-132676

(51) Int. Cl.
*G06F 21/00* (2013.01)
(52) U.S. Cl.
USPC .......................................................... 726/19
(58) Field of Classification Search
USPC .................................................... 726/16, 19
See application file for complete search history.

(56) References Cited

U.S. PATENT DOCUMENTS

| | | | | |
|---|---|---|---|---|
| 6,202,092 B1* | 3/2001 | Takimoto | ...................... | 709/225 |
| 6,725,770 B2* | 4/2004 | Maeda | ........................... | 101/129 |
| 7,586,635 B2* | 9/2009 | Maeda et al. | ................ | 358/1.15 |
| 7,623,255 B2* | 11/2009 | Simpson | ...................... | 358/1.15 |
| 7,904,572 B2* | 3/2011 | Tadokoro et al. | ............. | 709/229 |
| 8,072,636 B2* | 12/2011 | Mizuno | ........................ | 358/1.15 |
| 8,115,941 B2* | 2/2012 | Takahashi | ................... | 358/1.14 |
| 2003/0063311 A1* | 4/2003 | Covitt et al. | ................. | 358/1.15 |
| 2003/0179404 A1* | 9/2003 | Matsueda | ..................... | 358/1.15 |
| 2003/0218643 A1* | 11/2003 | Sakata et al. | .................... | 345/865 |
| 2004/0199399 A1* | 10/2004 | Sugiyama | ........................ | 705/1 |
| 2005/0120244 A1* | 6/2005 | Choi | ............................ | 713/201 |
| 2005/0172118 A1* | 8/2005 | Nasu | ............................. | 713/156 |
| 2005/0210265 A1* | 9/2005 | Dombkowski et al. | ........ | 713/185 |
| 2005/0254070 A1* | 11/2005 | Sayama | ........................ | 358/1.1 |
| 2005/0275867 A1* | 12/2005 | Higashiura et al. | .......... | 358/1.14 |
| 2006/0044611 A1* | 3/2006 | Aoki et al. | .................... | 358/1.15 |
| 2006/0087678 A1* | 4/2006 | Simpson | ...................... | 358/1.15 |
| 2006/0104656 A1* | 5/2006 | Tomita et al. | .................... | 399/80 |
| 2006/0242579 A1* | 10/2006 | Mishima et al. | ............... | 715/700 |
| 2007/0002050 A1* | 1/2007 | Aoki et al. | ..................... | 345/428 |
| 2007/0022469 A1* | 1/2007 | Cooper et al. | ..................... | 726/3 |
| 2007/0052992 A1* | 3/2007 | Yamada | ........................ | 358/1.13 |
| 2007/0091346 A1* | 4/2007 | Ogura et al. | .................. | 358/1.14 |
| 2007/0103711 A1* | 5/2007 | Funakawa | ...................... | 358/1.13 |
| 2007/0133033 A1* | 6/2007 | Mizutani et al. | .............. | 358/1.14 |
| 2007/0171446 A1* | 7/2007 | Yamamoto et al. | ........... | 358/1.11 |
| 2007/0172281 A1* | 7/2007 | Inoue et al. | ...................... | 400/62 |
| 2007/0177186 A1* | 8/2007 | Kishimoto | ................... | 358/1.14 |
| 2007/0271383 A1* | 11/2007 | Kim et al. | ...................... | 709/227 |
| 2007/0271474 A1* | 11/2007 | Kim et al. | ...................... | 713/310 |

(Continued)

FOREIGN PATENT DOCUMENTS

| | | |
|---|---|---|
| JP | 2003-150355 | 5/2003 |
| JP | 2006-99747 | 4/2006 |

OTHER PUBLICATIONS

Japanese official action dated Jul. 17, 2012 in corresponding Japanese patent application No. 2008-132676.

*Primary Examiner* — David García Cervetti
(74) *Attorney, Agent, or Firm* — Cooper & Dunham LLP (57) ABSTRACT

An apparatus, method, system, computer program and product each capable of controlling addition of a printing function or controlling use of the printing function are disclosed.

16 Claims, 7 Drawing Sheets

| AUTHENTICATION KEY | DRAWING AREA |
|---|---|
| "BASIC" | (top, left, bottom, right) = (100, 100, 300, 4000) |
| "PREMIUM" | (top, left, bottom, right) = (100, 100, 6000, 4000) |
| "BROADSIDE" | (top, left, bottom, right) = (100, 100, 3000, 4000) |

(56) References Cited

U.S. PATENT DOCUMENTS

| | | | |
|---|---|---|---|
| 2008/0005779 A1* | 1/2008 | Takenaka et al. | 726/1 |
| 2008/0010425 A1* | 1/2008 | Funk et al. | 711/163 |
| 2008/0010636 A1* | 1/2008 | Funk et al. | 717/168 |
| 2008/0010637 A1* | 1/2008 | Walmsley et al. | 717/168 |
| 2008/0022083 A1* | 1/2008 | Funk et al. | 713/1 |
| 2008/0130026 A1* | 6/2008 | Mizuno | 358/1.9 |
| 2008/0134011 A1* | 6/2008 | Ogura | 715/200 |
| 2009/0153896 A1* | 6/2009 | Maruyama et al. | 358/1.14 |
| 2009/0213422 A1* | 8/2009 | Ono | 358/1.15 |

* cited by examiner

| AUTHENTICATION KEY | DRAWING AREA |
|---|---|
| "BASIC" | (top, left, bottom, right) = (100, 100, 300, 4000) |
| "PREMIUM" | (top, left, bottom, right) = (100, 100, 6000, 4000) |
| "BROADSIDE" | (top, left, bottom, right) = (100, 100, 3000, 4000) |

CONTROLLING IMAGE FORMING FUNCTION

CROSS-REFERENCE TO RELATED APPLICATIONS

This patent application is based on and claims priority under 35 U.S.C. §119 to Japanese Patent Application Nos. 2007-202205 filed on Aug. 2, 2007, and 2008-132676 filed on May 21, 2008, in the Japanese Patent Office, the disclosure of which is hereby incorporated herein by reference.

FIELD OF THE INVENTION

The present invention generally relates to an apparatus, method, system, computer program and product each capable of controlling image forming function, and more specifically to an apparatus, method, system, computer program and product each capable of controlling addition of a printing function or controlling use of the printing function.

BACKGROUND

Recently, an image forming system may be provided, which includes a printer and an information processing apparatus that are connected via a network. To print data created by an application installed on the information processing apparatus, the information processing apparatus generates print data using a printer driver, and sends the print data to the printer via the network. The printer, which receives the print data, forms an image according to the print data.

When the image forming system includes a plurality of printers, the user at the information processing apparatus may select one of the plurality of printers according to the user need. In order to be able to print data using more than one printer, the information processing apparatus is usually provided with more than one printer driver each corresponding to the printer that the user desires to select for printing. However, in some cases, an administrator may want to restrict the use of printing functions that may be provided by at least one of the plurality of printers.

For example, the Japanese Patent Application Publication No. 2003-150355 describes a printing system including a virtual printer capable of restricting printing operation by determining whether to permit or not to permit printing. However, the above-described printing system does not consider whether to permit or not to permit the use of a specific printing function.

SUMMARY

Example embodiments of the present invention include an information processing apparatus including a printer driver to generate print data, and an additional component to provide a specific function to the printer driver when executed. The printer driver obtains an authentication result indicating whether authentication information obtained from the additional component is registered. When the authentication result indicates that the authentication information is registered, the printer driver obtains function usage information that corresponds to the authentication information being obtained, and controls the use of the specific function based on the function usage information.

Example embodiments of the present invention include a method of controlling a printing function of an information processing apparatus. The function controlling method includes: providing an additional component, which provides a specific function to a printer driver installed on the information processing apparatus when executed; determining whether authentication information obtained from the additional component is registered to generate an authentication result; obtaining function usage information that corresponds to the authentication information when the authentication result indicates that the authentication information is registered; and controlling the use of the specific function based on the function usage information.

Example embodiments of the present invention include an image forming system including an information processing apparatus to generate print data, and an image forming apparatus to receive the print data from the information processing apparatus and form an image based on the print data. The information processing apparatus includes a printer driver to generate the print data and an additional component configured to provide, when executed, a specific function to the printer driver. The printer driver obtain an authentication result indicating whether authentication information obtained from the additional component is registered. When the authentication result indicates that the authentication information is registered, the printer driver obtains function usage information that corresponds to the authentication information and controls the use of the specific function based on the function usage information. The image forming system may additionally include a license server, which may determine whether the authentication information obtained from the additional component is registered to generate the authentication result, and send the authentication result to the information processing apparatus.

In addition to the above-described example embodiments, the present invention may be practiced in various other ways, for example, as a computer program including a plurality of instructions which causes a computer to perform the above-described method or an apparatus to perform the above-described functions, or as a computer readable medium storing a plurality of instructions which causes a computer to perform the above-described method or an apparatus to perform the above-described functions.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Figure 1:
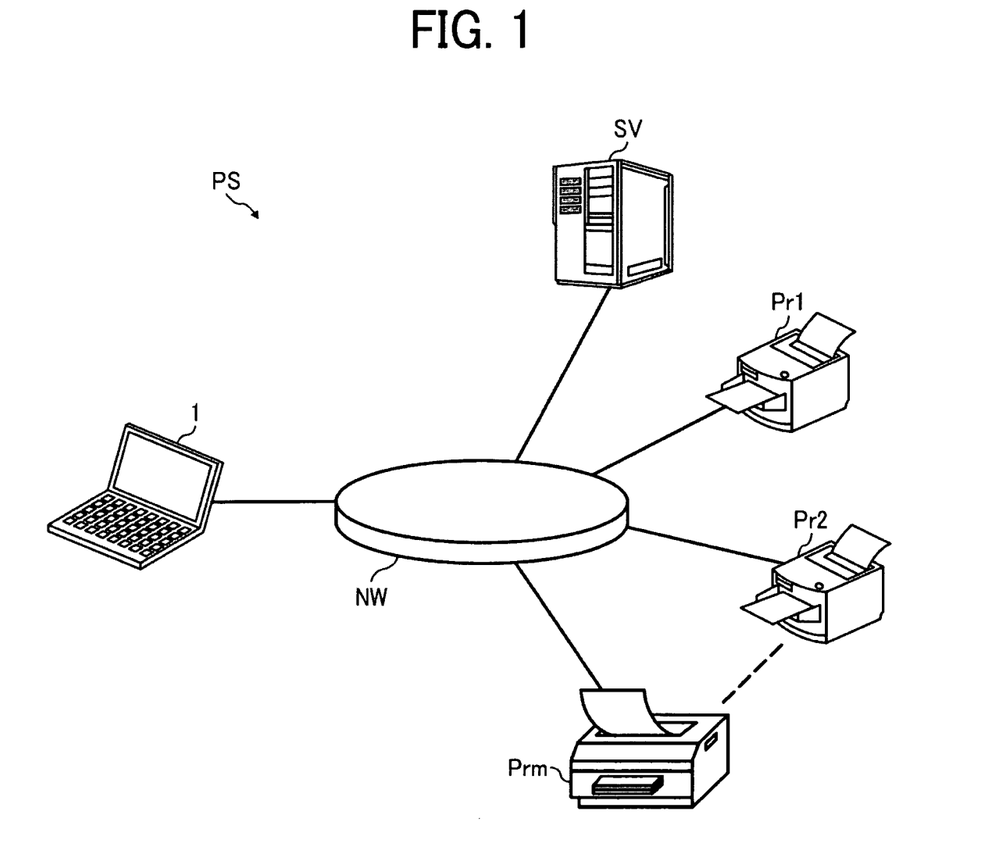
FIG. 1 is a schematic diagram illustrating a network configuration of a printing system including an information processing apparatus and a plurality of printers, according to an example embodiment of the present invention.

Referring now to FIG. 1, a printing system PS including an information processing apparatus 1 is explained according to an example embodiment of the present invention. The printing system PS includes the information processing apparatus 1, a license server SV, and a plurality of printers Pr1 to Prm, which are connected through a network NW.

The information processing apparatus 1 may be implemented by any desired computer including, for example, a desktop computer, laptop computer, palmtop computer, etc. For the descriptive purpose, in this example, the information processing apparatus 1 may be referred to as the computer 1. The computer 1 generates print data, and sends the print data to at least one of the printers Pr1 to Prm, which may be collectively referred to as the printer Pr, via the network NW. In this example, the network NW may be any desired wired or wireless network such as a local area network (LAN), universal serial bus (USB) cable, infrared wireless network, etc. When the print data is received, the printer Pr prints an image on a recording medium according to the print data using any desired printing method, such as electrophotographic method or ink jet method.

The printing system PS may be implemented in various other ways. For example, more than one information processing apparatus 1 may be provided in the printing system PS. In another example, any desired image forming apparatus may be provided in addition to the printers Pr1 to Prm or in place of at least one of the printers Pr1 to Prm, for example, a copier, facsimile, multifunctional peripheral apparatus, etc. In another example, any number of printers Pr1 to Prm or image forming apparatus may be provided. In another example, the license server SV may not be provided, as long as the function of the license server SV is performed by at least one of the apparatuses existed on the network NW.

Figure 2:
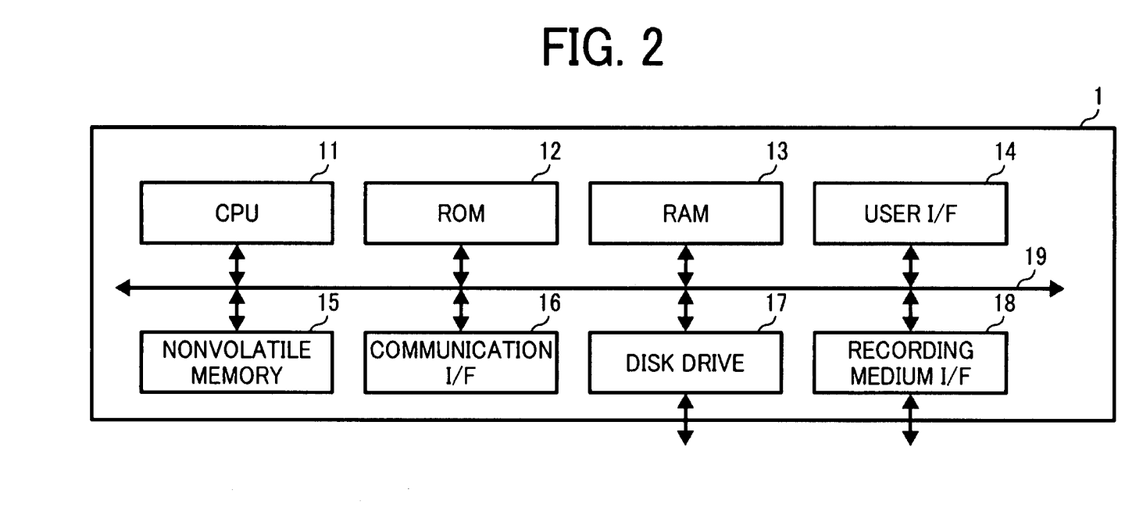
FIG. 2 is a schematic block diagram illustrating a hardware structure of the information processing apparatus shown in FIG. 1, according to an example embodiment of the present invention.

Referring to FIG. 2, the computer 1 includes a central processing unit (CPU) 11, read only memory (ROM) 12, random access memory (RAM) 13, user interface (I/F) 14, nonvolatile memory 15, communication interface (I/F) 16, disk drive 17, and recording medium I/F 18, which are connected to one another via a system bus 19.

The disk drive 17 may be connected to any desired disk device including, for example, a hard disk device (HDD) or a flexible disk. The disk drive 17 writes data to or reads data from the disk device under control of the CPU 11.

The recording medium I/F 18 may be connected to a removable recording medium including, for example, a universal serial bus (USB) memory, secure digital (SD) card memory, flash memory, compact disc (CD), compact disc rewritable (CD-RW), digital video disc (DVD), or flexible disk. The recording medium I/F 18 writes data to or reads data from the recording medium under control of the CPU 11.

The communication I/F 16 allows the CPU 11 to communicate with other apparatuses such as the license server SV and the printer Pr via the network NW (FIG. 1).

The nonvolatile memory 15 stores various data under control of the CPU 11 in a nonvolatile form such that the data is not automatically deleted after the power of the computer 1 is turned off.

The user I/F 14 allows the user to interact with the computer 1. The user I/F may include an input device such as a mouse or a keyboard, and an output device such as a liquid crystal display (LCD) or a speaker.

The RAM 13 may function as a work area of the CPU 11. The ROM 12 may store various data including, for example, various programs to be run by the CPU 11 or system data.

The CPU 11 controls operation or function of the computer 1, for example, by executing a program being loaded in the RAM 13. The program may be stored in any one of the ROM 12, the nonvolatile memory 15, the disk device connectable to the disk drive 17, the recording medium connectable to the recording medium I/F 18, or any other device accessible from the CPU 11 via the network NW. The program being stored may include any desired operating system (OS) such as the Windows, any desired application program, any desired printer driver, or any desired device driver. Specifically, in this example, an information processing program capable of causing the computer 1 to manage addition or use of one or more printing functions may be stored. For example, when executed, the information processing program may cause the printer driver 3 to perform operation of controlling the addition or use of a specific printing function, which may be provided by an additional software component upon execution of the additional component. The information processing program may be written in any desired language including, for example, the legacy programming language such as assembler, C, C++, C#, Java, or the project-oriented programming language.

Figure 3:
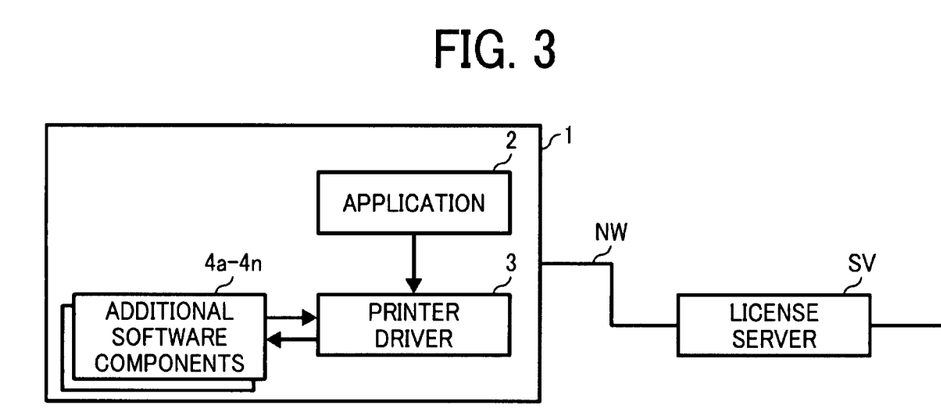
FIG. 3 is a schematic block diagram illustrating a functional structure of a portion of the information processing apparatus shown in FIG. 1, according to an example embodiment of the present invention.

Referring now to FIG. 3, a functional structure of the computer 1 is explained according to an example embodiment of the present invention. In addition to the OS, the computer 1 includes an application 2, a printer driver 3, and a plurality of additional software components 4a to 4n, each of which may run on the OS when executed.

The application 2 may include, for example, a document generating program providing the function of generating or editing document data, drawing program providing the function of generating or editing drawing data, spreadsheet program, and/or database program. In operation, when the application 2 receives a user instruction for printing data created using the application 2, the application 2 causes the user I/F 14 to display a print settings screen to request the user to set the print settings. When the print settings are set, the application 2 sends the data to be printed and the print settings information regarding the print settings to the printer driver 3.

When the data to be printed and the print settings information are received from the application 2, the printer driver 3 converts the data to print data, which is a format interpretable by the printer Pr. For example, the printer driver 3 may generate the print data by drawing, page by page, data of characters or images. The printer driver 3 further generates a printing job from the print data and the print settings information, and sends the printing job to the printer Pr. In this example, any number of printer drivers 3 may be provided in the computer 1. For example, the number of the printer drivers 3 may correspond to the number of printers Pr1 to Prm shown in FIG. 1.

The plurality of additional software components 4a to 4n, which may be collectively referred to as the additional component 4, is capable of providing one or more additional functions to the printer driver 3 when installed. The additional component 4 may be implemented by, for example, a plug-in program that interacts with the printer driver 3. In this example, any number of additional components 4 may be provided, including one additional component, from any desired storage device or medium via the recording medium I/F 18. Alternatively, the additional component 4 may be provided from the network NW via the communication I/F 16. Specifically, in this example, the plurality of additional software components 4a to 4n may each be provided with a specific function to be added to the printer driver 3, and an authentication key that is previously determined so as to allow the printer driver 3 to control addition or use of the specific function.

In operation, before the function is added to the printer driver 3 from the additional component 4 or before using the function of the additional component 4, the printer driver 3 may determine whether the authentication key of the additional component 4 matches an authentication key that has been registered ("registered authentication key") to obtain an authentication result. The registered authentication key may be stored in any desired memory as long as it is obtainable from the printer driver 3. Based on the authentication result, the printer driver 3 may allow addition of the specific function provided by the additional component 4. Further, based on the authentication key being authenticated, the printer driver 3 may control the use of the specific function to be added, for example, by obtaining function usage information that corresponds to the authentication key being authenticated and causing the additional component to perform the specific function in a manner specified by the function usage information.

For example, the additional component 4 may provide the printer driver 3 with the function of adding data, such as a stamp of a character or an image, to a drawing area of the print data. When the stamping function is added, the printer driver 3 becomes able to add the stamp to the drawing area, using the function of drawing a character or an image that has been previously provided to the printer driver 3.

The addition of the stamping function may be determined based on whether the authentication key being obtained from the additional component 4 matches any one of the registered authentication keys. In this manner, the printer driver 3 may only allow the addition of the specific function, which is previously authorized.

Further, in this example, the use of the stamping function, such as the characteristics of the drawing area to which the stamp is added, may be controlled using the authentication key. For example, the function usage information specifying the dimension or the position of the drawing area may be previously generated and stored in a corresponding manner with the authentication key. Once the authentication key is authenticated, the function usage information may be obtained. Using the function usage information, the dimension or the position of the drawing area to which the stamp is added may be controlled. In this manner, the printer driver 3 may only allow the specific function to be used in a manner previously authorized.

Figure 6:
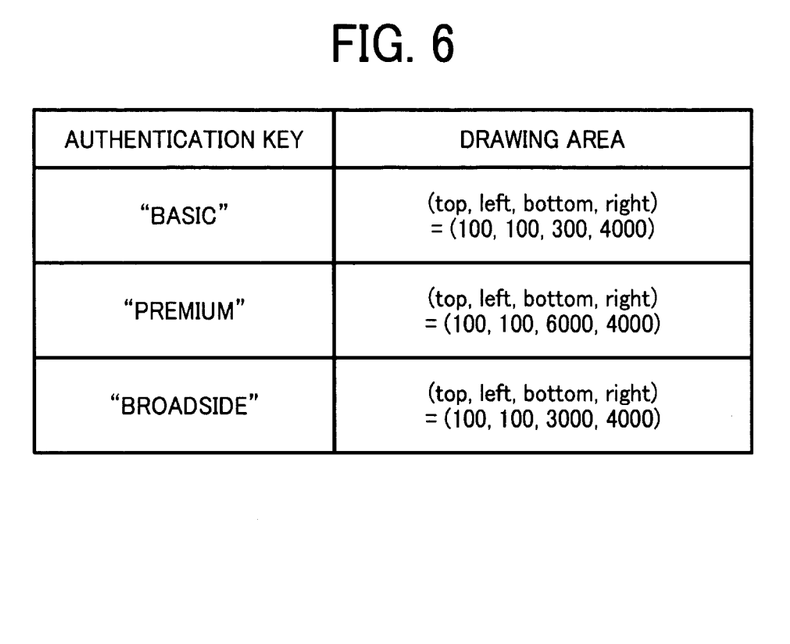
FIG. 6 is a table storing a plurality of types of authentication keys and information regarding a drawing area with respect to each one of the plurality of types of authentication keys, according to an example embodiment of the present invention.

In order to provide the above-described function, a plurality of types of authentication keys may be generated. In one example, the authentication key may be a universal unique ID, which may be a character string or a numerical value that is arbitrarily generated. Since the universal unique ID can be arbitrarily generated, various types of authentication keys may be easily generated. For example, as illustrated in FIG. 6, the authentication key may be any one of character strings including "BASIC", "PREMIUM", and "BROADSIDE".

In another example, geographical information indicating a specific graphical region such as "Japan" or "United States", which may be embedded into the additional component 4, the printer driver 3, the OS, or the printer Pr, may be used as the authentication key. In such case, the authentication key may be expressed as any one or any desired combination selected from the geographical information of the additional component 4, the geographical information of the printer driver 3, the geographical information of the OS, and the geographical information of the printer Pr. With this combination, various types of authentication keys may be easily generated.

Once the plurality of types of authentication keys is generated, each of which corresponds to one of a plurality of specific functions provided by the additional component 4, the function usage information that may control the use of the specific function may be assigned to each one of the plurality of types of authentication keys. For example, as illustrated in FIG. 6, the function usage information indicating the dimension and the position of the drawing area may be stored with respect to the corresponding one of the authentication key types. With this function usage information, the printer driver 3 may be able to control the use of the specific function provided by the additional component 4, once the authentication key is obtained from the additional component 4.

Figure 4:
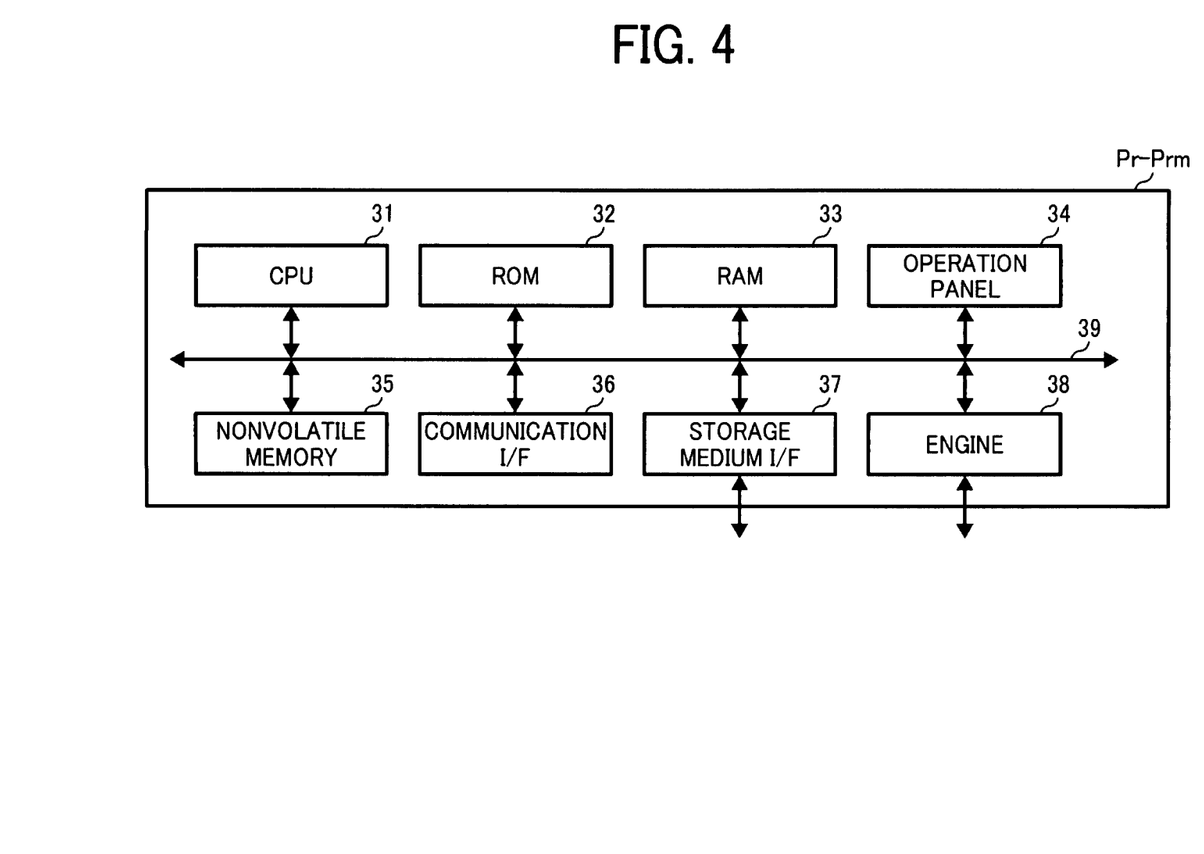
FIG. 4 is a schematic block diagram illustrating a hardware structure of at least one of the plurality of printers shown in FIG. 1, according to an example embodiment of the present invention.

Referring now to FIG. 4, a hardware structure of the printer Pr is explained according to an example embodiment of the present invention. The printer Pr includes a CPU 31, ROM 32, RAM 33, operation panel 34, nonvolatile memory 35, communication I/F 36, storage medium I/F 37, and engine 38, which are connected to one another via a system bus 39.

The CPU 31 controls operation of the printer Pr. The RAM 33 may function as a work area of the CPU 31. The ROM 32 may store various data such as a program or system data specific to the printer Pr. For example, the ROM 32 may store an image forming program that causes, when executed by the CPU 31, the printer Pr to perform operation of printing. In printing operation, the CPU 31 receives print data from the computer 1, converts the print data to drawing data, and stores the drawing data in the RAM 33.

The operation panel 34 may include an input device capable of inputting various data including, for example, various keys such as a start key, stop key, ten key, image quality settings key, mode settings key, etc., and an output device capable of outputting various data including, for example, a display device such as a liquid crystal display (LCD). In operation, the user may input a user instruction through the input device of the operation panel 34 to cause the printer Pr to perform various operation. In response to the user instruction, the output device of the operation panel 34 may display the user instruction to receive user confirmation, or display various information generated by the printer Pr. The operation panel 34 may be provided as a touch panel screen having the functions of inputting and outputting.

The nonvolatile memory 35 stores various data in a nonvolatile form such that the various data is not automatically erased even after the power of the printer Pr is turned on. The various data being stored may include, for example, settings information of the printer Pr, or log information including information regarding an error when the error is generated.

The communication I/F 36 allows the printer Pr to communicate with the other apparatus via the network NW.

The storage medium I/F 37 may be connected with a storage device such as a hard disk device (HDD). The storage device may store various data including, for example, font data, program, or character data. The CPU 31 may write data onto or read data from the storage device via the storage medium I/F 37.

The engine 38 forms an image on a recording medium according to the drawing data being read from the RAM 33 using any desired image forming method, such as an ink jet method, electrophotographic method, or thermal transfer recording method. For example, when using the electrophotographic method, the engine 38 may be provided with a plurality of image forming devices such as a photoconductor, optical writing device, developer, charger, cleaner, etc. The optical writing device forms a latent image on the photoconductor according to the drawing data or a control signal converted from the drawing data. The developer develops the latent image with toner to form a toner image. The toner image is then transferred to a recording sheet, which may be fed by a sheet feeding device. The recording sheet having the toner image is further transferred to a fixing device, which fixes the toner image onto the recording sheet with heat and pressure.

Figure 5:
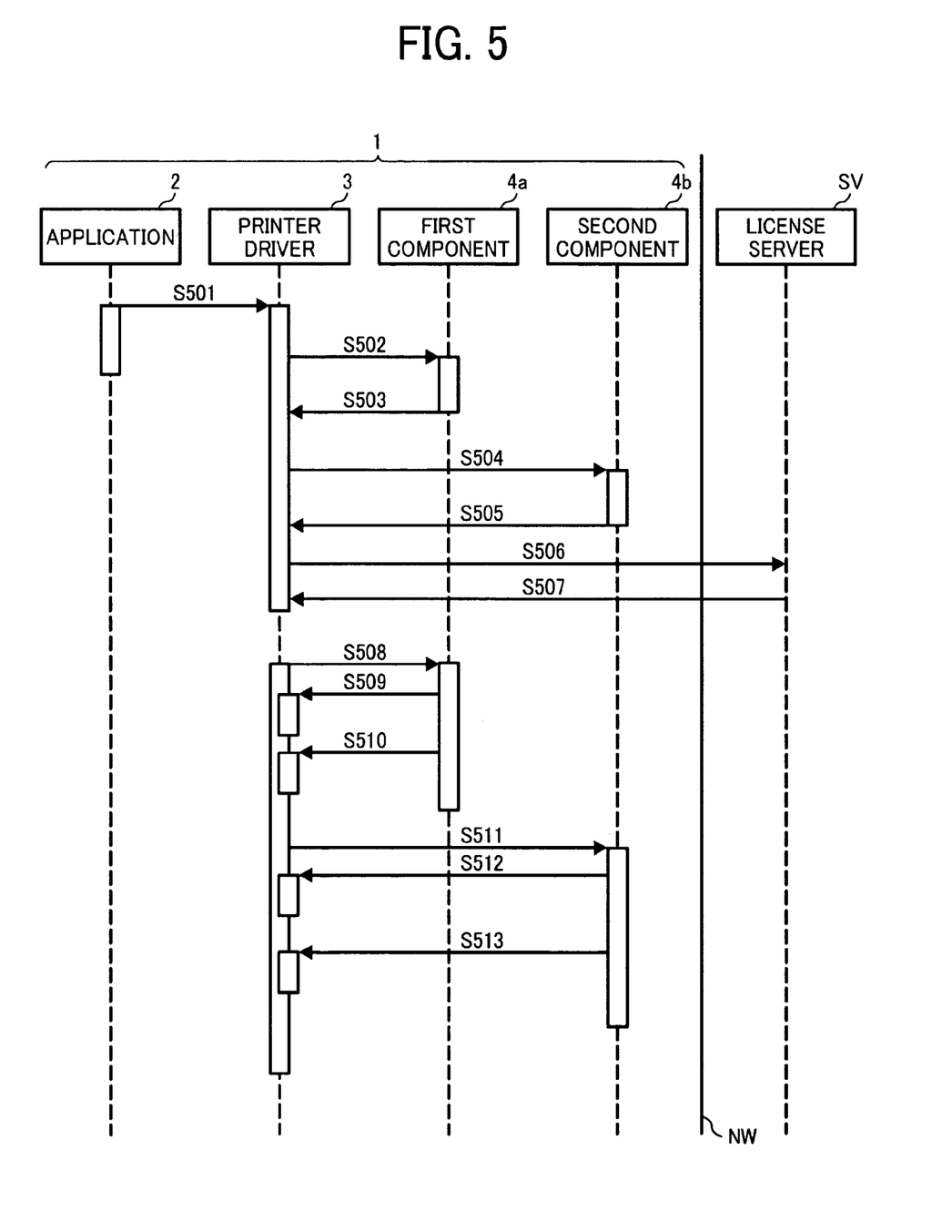
FIG. 5 is a sequence diagram illustrating operation of controlling addition and use of a function, performed by the image forming system shown in FIG. 1, according to an example embodiment of the present invention.

Referring now to FIG. 5, operation of controlling addition or use of a specific function is explained according to an example embodiment of the present invention. In this example, the additional components 4a and 4b are assumed to be installed so as to add the specific functions respectively provided by the additional components 4a and 4b to the printer driver 3. For the descriptive purpose, the additional components 4a and 4b may be respectively referred to as the first component 4a and the second component 4b.

When a user instruction for printing is received through the application 2 at S501, at S502, the printer driver 3 requests the first component 4a for an authentication key. When the request is received, at S503, the first component 4a sends a first authentication key to the printer driver 3. For example, the first component 4a may write the first authentication key in a memory area specified by the printer driver 3. The printer driver 3 may obtain the first authentication key by reading the first authentication key from the specified memory area.

At S504, the printer driver 3 requests the second component 4b for an authentication key. When the request is received, at S505, the second component 4b sends a second authentication key to the printer driver 3. For example, the second component 4b may write the second authentication key in a memory area specified by the printer driver 3. The printer driver 3 may obtain the second authentication key by reading the second authentication key from the specified memory area.

When the first authentication key and the second authentication key are obtained respectively from the first component 4a and the second component 4b, the printer driver 3 may determine whether the first and second authentication keys are respectively registered to generate authentication results. For example, at S506, the printer driver 3 may send the first and the second authentication keys to the license server SV (FIG. 1) via the network NW, and requests the license server SV to determine whether the first and the second authentication keys are respectively registered to generate authentication results. In this example, the computer 1 and the license server SV are assumed to communicate with each other using TCP/IP protocol.

At S507, the license server SV may determine whether the first authentication key matches any one of the registered authentication keys, which may be stored in a memory of the license server SV, to generate a first authentication result. In a substantially similar manner, the license server SV may determine whether the second authentication key matches any one of the registered authentication keys, which may be stored in a memory of the license server SV, to generate a second authentication result. The license server SV sends the printer driver 3 with the first authentication result indicating whether the first authentication key is registered, and the second authentication result indicating whether the second authentication key is registered. Further, at S507, the license server SV may obtain first function usage information that corresponds to the first authentication key, and second function usage information that corresponds to the second authentication key. The first and second function usage information may be stored in a memory of the license server SV in a manner such that the first and second function usage information respectively correspond to the first and second authentication keys that are registered.

Assuming that the first authentication result indicates that the first authentication key is registered, at S508, the printer driver 3 allows the first component 4a to add a specific function, which is previously determined, by sending an instruction to the first component 4a that requests the addition of the specific function. Further, the printer driver 3 may analyze the first function usage information that corresponds to the first authentication key, and send an instruction to the first component 4a requesting that the specific function be used in a manner specified by the first function usage information. In response, at S509 and S510, the first component 4a provides the printer driver 3 with the specific function in the manner specified by the first function usage information.

Assuming that the second authentication result indicates that the second authentication key is registered, at S511, the printer driver 3 allows the second component 4b to add a specific function, which is previously determined, by sending an instruction to the second component 4b that requests the addition of the specific function. Further, the printer driver 3 may analyze the second function usage information that corresponds to the second authentication key, and send an instruction to the second component 4b requesting that the specific function be used in a manner specified by the second function usage information. In response, at S512 and S513, the second component 4a provides the printer driver 3 with the specific function in the manner specified by the second function usage information.

In this example, the first component 4a and the second component 4b are assumed to be each provided with the function of adding data, such as a stamp of an image and/or a character, to a drawing area of print data. Further, in this example, the table shown in FIG. 6 may be stored in a memory of the license server SV. The table of FIG. 6 stores three types of authentication keys including the "BASIC" key, "PREMIUM" key, and "BROADSIDE" key, and function usage information regarding the dimension and the position of the drawing area for each type of authentication keys. Once the authentication key obtained from the additional component 4 is identified, the printer driver 3 may obtain function usage information regarding the dimension and the position of the drawing area that corresponds to the authentication key being identified. After analyzing the function usage information, the printer driver 3 may send an instruction to the additional component 4 to cause the additional component 4 to add data, such as the stamp of the character and/or image, to the drawing area having the characteristics being specified by the function usage information. By restricting the drawing area, for example, to be smaller than the entire portion of the print data, a specific portion of the print data may be left unstamped such that additional information such as advertising may be added at any time to generate print data as illustrated in FIG. 7C. Referring to FIG. 7C, a portion CA is left unstamped. In this example, the printer driver 3 may send the instruction as an argument of the function of the additional component 4. Further, the dimension and/or the position of the drawing area may be controlled, page by page.

Figure 7A:
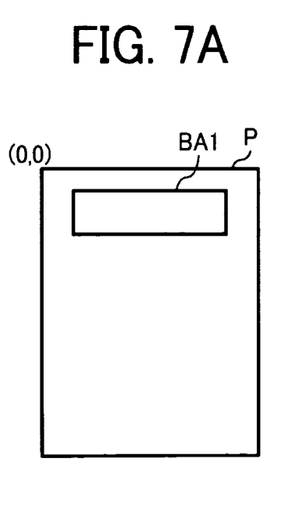
FIGS. 7A to 7C are illustrations for explaining operation of controlling use of a function of drawing data to a drawing area according to an example embodiment of the present invention.

For example, when the first authentication key obtained from the first component 4a is the "BASIC" key of FIG. 6, at S508, the printer driver 3 instructs the first component 4a to perform the additional function of adding the stamp to the drawing area having the characteristics specified by the function usage information corresponding to the "BASIC" key, such as the drawing area BA1 of FIG. 7A. Referring to FIGS. 6 and 7A, the drawing area BA1 corresponds to a top portion of a page, which may be expressed as (top=100, left=100, bottom=300, right=400). In this example, the top and bottom values correspond to the positions of the Y axis with respect to the origin (0, 0) of the page. The left and right values correspond to the positions of the X axis with respect to the origin (0, 0) of the page.

When information regarding the drawing area is sent from the printer driver 3, at S509, the first component 4a may add the stamp of a character to the drawing area BA1 using the function of drawing the character of the printer driver 3. At S510, the first component 4a may add the stamp of an image to the drawing area BA1 using the function of drawing the image of the printer driver 3.

Figure 7B:
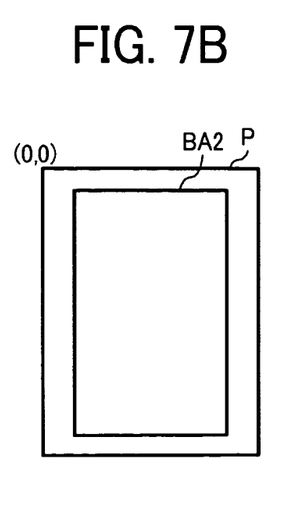
Figure 7C:
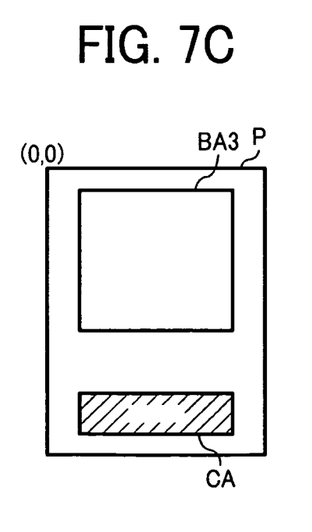

For example, when the second authentication key obtained from the second component 4b is the "PREMIUM" key of FIG. 6, at S511, the printer driver 3 instructs the second component 4b to perform the additional function of adding the stamp to the drawing area having the characteristics specified by the function usage information corresponding to the "PREMIUM" key, such as the drawing area BA2 of FIG. 7B. Referring to FIGS. 6 and 7B, the drawing area BA2 corresponds to almost an entire portion of a page, which may be expressed as (top=100, left=100, bottom=6000, right=4000).

When information regarding the drawing area is sent from the printer driver 3, at S512, the second component 4b may add the stamp of a character to the drawing area BA2 using the function of drawing the character of the printer driver 3. At S513, the second component 4b may add the stamp of an image to the drawing area BA2 using the function of drawing the image of the printer driver 3.

The printer driver 3 may send print data, which may be generated using the additional functions provided by the first and second component 4a and 4b, to the printer Pr via the network NW. When the print data is received, the printer Pr may form an image according to the print data, and the operation ends.

The operation of FIG. 5 may be performed in various other ways.

In one example, authentication of the authentication key may be performed in various other ways. Further, information regarding the registered authentication keys may be stored in any place on the network NW other than the memory of the license server SV. For example, rather than requesting the license server SV to determine whether the authentication key is registered, the printer driver 3 may be provided with information regarding the registered authentication keys, for example, the table shown in FIG. 6, in its memory. When the authentication key is obtained from the additional component 4, the printer driver 3 may determine whether the authentication key being obtained matches any one of registered authentication keys to generate an authentication result. Alternatively, the computer 1 may be provided with a license obtainer, which performs operation of authenticating. In such case, the printer driver 3 requests the license obtainer to perform authentication and receive an authentication result generated by the license obtainer. Alternatively, the printer Pr may function as the license server SV. In such case, information regarding the registered authentication keys, for example, the table shown in FIG. 6, may be stored in the nonvolatile memory 35 of FIG. 4. Further, when a request for authentication is received from the printer driver 3 with the authentication key being obtained from the additional component 4, the CPU 31 of FIG. 4 may perform operation of determining whether the authentication key being obtained is registered by referring to the table shown in FIG. 6.

In another example, the function usage information may be obtained from any one of the computer 1, the license server SV, and the printer Pr, depending on where such information is stored.

In another example, as described above referring to FIG. 3, the geographical information, which may be embedded in any one of the printer driver 3, the additional component 4, the OS, and the printer Pr, may be used as the authentication key. For example, when the geographical information obtained from the additional component 4 matches the geographical information obtained from the printer driver 3, the printer driver 3 may determine that authentication is successful. Alternatively, when the geographical information obtained from the additional component 4 matches the geographical information obtained from the printer driver 3 and the OS, the printer driver 3 may determine that authentication is successful. For example, when the OS is based on Windows, the geographical information may be obtained through the "GetLocaleInfo( )" function.

In another example, authentication may be performed at any desired timing other than the time when the additional component 4 is being executed. For example, authentication may be performed before the additional component 4 is executed. For example, assuming that the OS is based on the Windows, the authentication key may be written in a registry or a predetermined file when the additional component 4 is read from the memory or the network NW. The authentication key may be read out by the printer driver 3 at any desired time without executing the additional component 4 to perform authentication to generate an authentication result. The authentication result, which may be stored in a memory, may be referred by the printer driver 3 when the additional component 4 is executed, for example, when a user instruction for printing is received through the application 2. Based on the authentication result, the printer driver 3 may generate and send an instruction as described above referring to FIG. 5.

In another example, addition or use of the specific function to be provided by the additional component 4 may be controlled in various other ways. For example, the contents to be added may be controlled based on the function usage information that corresponds to the authentication key being obtained. For example, when the authentication key is the "BASIC" key, the function usage information may be previously determined so as to cause the printer driver 3 to allow addition of the image while prohibiting the addition of the character. Alternatively, when the authentication key is the "PREMIUM" key, the function usage information may be previously determined so as to cause the printer driver 3 to allow addition of both of the image and the character.

Figure 9:
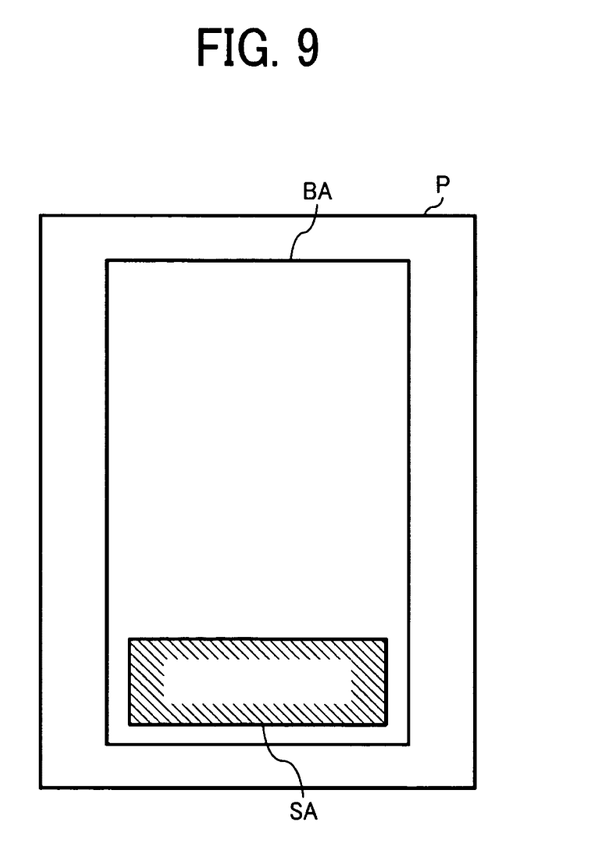
FIG. 9 is an illustration for explaining operation of controlling use of a function of drawing data to a drawing area according to an example embodiment of the present invention.

In another example, the dimension or the position of the drawing area to be deleted may be controlled based on the function usage information that corresponds to the authentication key being obtained. For example, the printer driver 3 and the additional component 4 may be each provided with the function of drawing the image or character. In one example, the additional component 4 may provide the additional function of deleting a portion of the image or character, drawn by the printer driver 3, by filling out the portion to be deleted with a background color using the function of drawing. For example, referring to FIG. 9, when the function usage information indicating a portion to be deleted ("the erase area") is received from the printer driver 3, the additional component 4 may receive the data having the entire portion of a drawing area BA, and delete the erase area SA of the drawing area BA by filling the erase area SA with the background color of the paper P. In another example, the additional component 4 may provide the additional function of deleting a portion of the image or character by applying clipping to the portion to be deleted to prohibit the printer driver 3 to draw the portion to which clipping is applied.

In another example, in addition to or in place of the dimension and/or position of the drawing area, any other characteristics of the drawing area may be controlled using function usage information. For example, the number of drawing areas to be contained in one page of print data may be controlled.

In another example, the function usage information may cause the printer driver 3 to allow the additional component 4 to obtain printing settings information based on the corresponding authentication key. In such case, the printer driver 3 may send an instruction to the additional component 4, which includes a pointer specifying the place where the printing settings information is stored. In response, the additional component 4 may obtain the printing settings information using the pointer. With this function, the contents of the printing settings information to be obtained by the additional component 4 may be controlled by a plurality of items of function usage information that corresponds to a plurality of types of authentication keys.

In another example, the function usage information may cause the printer driver 3 to allow the additional component 4 to make the printing settings information invalid based on the corresponding authentication key. In such case, the printer driver 3 may send an instruction to the additional component 4, which includes a pointer pointing a function of invalidating the printing settings information. In response, the additional component 4 may invalidate the printing settings information using the function being obtained. With this function, the contents of the printing settings information to make invalid by the additional component 4 may be controlled by a plurality of items of function usage information that corresponds to a plurality of types of authentication keys. For example, the function usage information, which causes the function of aggregating images to be invalid, may be stored with respect to one of a plurality of types of authentication key.

Figure 8:
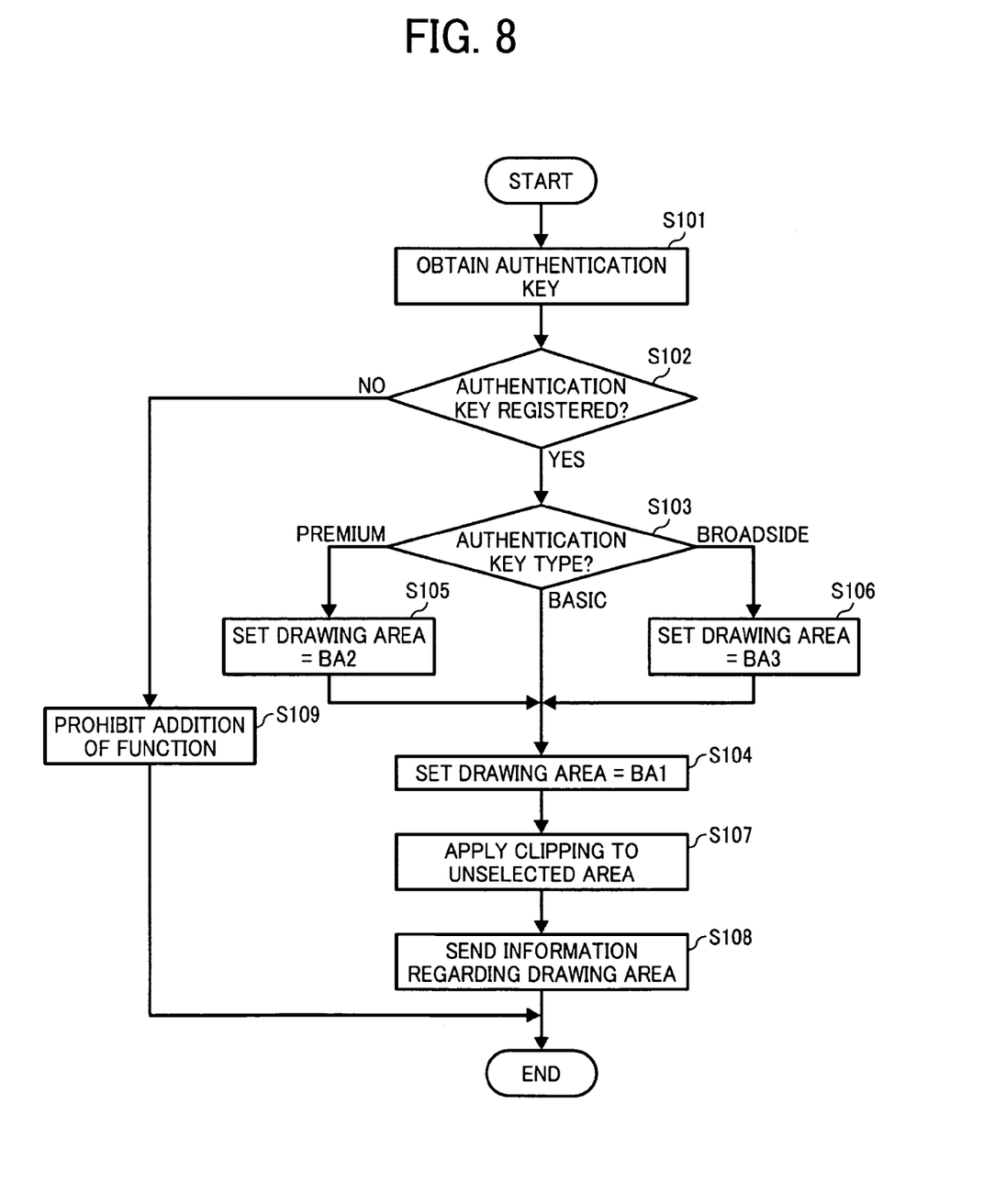
FIG. 8 is a flowchart illustrating operation of controlling use of a function of drawing data to a drawing area, performed by the information processing apparatus of FIG. 1, according to an example embodiment of the present invention.

Referring now to FIG. 8, operation of controlling the dimension and the position of the drawing area, performed by the printer driver 3, is explained according to an example embodiment of the present invention.

At S101, the printer driver 3 obtains an authentication key from the component 4.

At S102, the printer driver 3 determines whether the authentication key being obtained is any one of registered authentication keys, for example, by referring to the table shown in FIG. 6. When it is determined that the authentication key is one of the registered authentication keys ("YES" at S102), the operation proceeds to S103. When it is determined that the authentication key is not any one of the registered authentication keys ("NO" at S102), the operation proceeds to S109 to prohibit addition of the specific function provided by the component 4, and the operation ends. With this function of prohibiting addition of the specific function when authentication fails, the printer driver 3 may be protected from any component that is not authorized to be added to the printer driver 3.

At S103, the printer driver 3 determines whether the authentication key, being authenticated at S102, is one of the "BASIC", "PREMIUM", and "BROADSIDE" keys of FIG. 6. When it is determined that the authentication key is the "BASIC" key ("BASIC" at S103), the operation proceeds to S104. When it is determined that the authentication key is the "PREMIUM" key ("PREMIUM" at S103), the operation proceeds to S105. When it is determined that the authentication key is the "BROADSIDE" key ("BROADSIDE" at S103), the operation proceeds to S106.

At S104, the printer driver 3 sets the drawing area to be equal to the drawing area BA1 shown in FIG. 7A, which may be expressed as (top=100, left=100, bottom=300, right=400) as described above.

At S105, the printer driver 3 sets the drawing area to be equal to the drawing area BA2 shown in FIG. 7B, which may be expressed as (top=100, left=100, bottom=6000, right=4000) as described above.

At S106, the printer driver 3 sets the drawing area to be equal to the drawing area BA3 shown in FIG. 7C, which may be expressed as (top=100, left=100, bottom=3000, right=4000).

At S107, the printer driver 3 may apply clipping to a portion of the page other than the drawing area specified at any one of S104, S105, and S106. With the clipping being applied, any character or image that is added to a portion other than the drawing area becomes invisible.

At S108, the printer driver 3 may send information regarding the drawing area to the component 4, and the operation ends.

The operation of FIG. 8 may be performed in various other ways.

In one example, S107 of applying clipping may be performed by the additional component 4 according to an instruction sent by the printer driver 3.

As described above, by providing authentication information having a plurality of types with each type corresponding to a specific function to be provided by the additional component 4, the information processing apparatus 1 may control addition of a specific function with improved efficiency.

Further, as described above, by providing function usage information having a plurality of items with each item corresponding to a specific function to be provided by the additional component 4 or the authentication information type, the information processing apparatus 1 may control use of a specific function with improved efficiency.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An information processing apparatus, comprising:
a printer driver configured to generate print data; and
a plurality of additional components, each particular additional component configured to provide a corresponding specific function to the printer driver, the plurality of additional components including a plurality of types of authentication information, and each type of authentication information corresponding to an associated one of a plurality of specific functions provided by the additional components,
wherein the printer driver is configured to obtain the plurality of types of authentication information from the plurality of additional components, (ii) specify a section in a drawing area of the print data to be processed by each specific additional component of the plurality of additional components based on function usage information that is stored in association with each specific type of the plurality of types of authentication information, and performs the specific function of the specific additional component to the corresponding specified section on the drawing area.

2. The apparatus of claim 1, wherein the specific function of the additional component includes a function of adding data to a drawing area of the print data, and the function usage information specifies characteristics of the drawing area, and wherein the printer driver is configured to cause the additional component to apply the specific function according to the function usage information such that the data is added to the drawing area having the specified characteristics.

3. The apparatus of claim 2, wherein the characteristics of the drawing area includes at least a dimension and a position of the drawing area with respect to an entire portion of the print data, the at least one of the dimension and the position of the drawing area being previously determined so as not to overlap a selected portion of the print data.

4. The apparatus of claim 1, wherein the specific function of the additional component includes a function of setting a clipping area of the print data, and the function usage information specifies characteristics of the clipping area, and wherein the printer driver is configured to cause the additional component to apply the specific function according to the function usage information such that the clipping area has the specified characteristics.

5. The information processing apparatus of claim 1, further comprising:
a memory configured to store the plurality of types of authentication information; and
a license obtainer configured to determine whether the authentication information of the additional component is at least one of the plurality of types of authentication information being stored to generate the authentication result, and send the authentication result to the printer driver.

6. The information processing apparatus of claim 1, wherein in a case that a drawing area of image data to be processed into the print data is greater than the specified section in the drawing area of the print data, one of the plurality of specific functions provided by the additional components causes the printer driver to draw a drawing image within the specified section in the drawing area.

7. The information processing apparatus of claim 6, wherein the printer driver performs one or more of the plurality of specific functions that are associated with the plurality of types of authentication information that are used for specifying the specified section in the drawing area.

8. The information processing apparatus of claim 7, wherein the specific function of the additional component includes a function of painting the specified section in the drawing area with one color.

9. The information processing apparatus of claim 1, wherein the function usage information specifies dimension and position of the section to be processed by the corresponding additional component.

10. A method of controlling a printing function of an information processing apparatus, the method comprising:
providing a plurality of additional components, each particular additional component providing corresponding specific function to a printer driver installed on the information processing apparatus, the plurality of additional components including a plurality of types of authentication information, and each type of authentication information corresponding to an associated one of a plurality of specific functions provided by the additional components;
obtaining the plurality of types of authentication information from the plurality of additional components;
specifying a section in a drawing area of the print data to be processed by each specific additional component of the plurality of additional components based on function usage information that is stored in association with each specific type of the plurality of types of authentication information; and
performing the specific function of the specific additional component to the corresponding specified section on the drawing area.

11. The method of claim 10, further comprising:
sending to the additional component an instruction generated by the printer driver based on the function usage information, to cause the additional component to perform the specific function based on the function usage information, in a case that the specific function of the additional component includes a function of adding data to a drawing area of the print data, wherein the instruction comprises information regarding characteristics of the drawing area obtained from the function usage information.

12. The method of claim 10, further comprising:

storing the plurality of types of authentication information;

determining whether the authentication information of the additional component is at least one of the plurality of types of authentication information being stored to generate the authentication result; and sending the authentication result to the printer driver.

13. An image forming system, comprising:

an information processing apparatus configured to generate print data; and an image forming apparatus configured to receive the print data from the information processing apparatus and form an image based on the print data, wherein the information processing apparatus comprises:
  a printer driver configured to generate the print data; and
  a plurality of additional components, each particular additional component configured to provide a corresponding specific function to the printer driver, the plurality of additional components including a plurality of types of authentication information, and each type of authentication information corresponding to an associated one of a plurality of specific functions provided by the additional components, wherein the printer driver is configured to obtain the plurality of types of authentication information from the plurality of additional components, (ii) specify a section in a drawing area of the print data to be processed by each specific additional component of the plurality of additional components based on function usage information that is stored in association with each specific type of the plurality of types of authentication information, and performs the specific function of the specific additional component to the corresponding specified section on the drawing area.

14. The system of claim 13, wherein the image forming apparatus comprises:

a storage configured to store the plurality of types of the authentication information and a plurality of items of the function usage information; and a controller configured to determine whether the authentication information of the additional component is at least one of the plurality of types of authentication information being stored to generate the authentication result, and send the authentication result to the information processing apparatus.

15. The system of claim 13, further comprising:

a license server configured to store a plurality of types of authentication information and a plurality of items of function usage information; and a controller configured to determine whether the authentication information of the additional component is at least one of the plurality of types of authentication information being stored to generate the authentication result, and send the authentication result to the information processing apparatus.

16. The system of claim 13, wherein the authentication information is generated from geographical data obtained from at least one of the information processing apparatus and the image forming apparatus.

* * * * *